United States Patent
Deng et al.

(10) Patent No.: US 7,634,233 B2
(45) Date of Patent: Dec. 15, 2009

(54) TRANSMISSION SYSTEM WITH INTERFERENCE AVOIDANCE CAPABILITY AND METHOD THEREOF

(75) Inventors: Juinn-Horng Deng, Pingjhen (TW); Jeng-Kuang Hwang, Jhongli (TW); Po-Tien Lee, Renyi Village (TW); Fu-Chin Shau, Shetou Township, Changhua County (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 549 days.

(21) Appl. No.: 11/604,317

(22) Filed: Nov. 27, 2006

(65) Prior Publication Data

US 2008/0125046 A1 May 29, 2008

(51) Int. Cl.
*H04B 1/00* (2006.01)
(52) U.S. Cl. .............. 455/63.1; 455/114.2; 455/278; 455/296; 455/130; 375/260; 375/267; 375/222; 370/208; 370/335
(58) Field of Classification Search ............. 455/63.1, 455/114.2, 278, 296, 130, 189.1; 375/260, 375/267, 222, 346, 210, 220, 257, 284; 370/202, 370/335, 342
See application file for complete search history.

(56) References Cited

U.S. PATENT DOCUMENTS

| | | | |
|---|---|---|---|
| 5,184,196 A * | 2/1993 | Nakagawa et al. ........ 356/401 |
| 6,240,129 B1 * | 5/2001 | Reusens et al. ........... 375/222 |
| 6,445,730 B1 * | 9/2002 | Greszczuk et al. ........ 375/219 |
| 6,449,246 B1 * | 9/2002 | Barton et al. ............. 370/210 |
| 6,633,614 B1 * | 10/2003 | Barton et al. ............. 375/264 |
| 6,654,431 B1 * | 11/2003 | Barton et al. ............. 375/346 |
| 7,003,100 B2 * | 2/2006 | Lai et al. .................. 379/406.1 |
| 7,042,957 B1 * | 5/2006 | Zirwas ...................... 375/295 |
| 7,221,720 B2 * | 5/2007 | Robinson .................. 375/341 |
| 7,242,720 B2 * | 7/2007 | Sugiyama et al. .......... 375/260 |
| 7,251,768 B2 * | 7/2007 | Giannakis et al. .......... 714/755 |
| 7,272,108 B2 * | 9/2007 | Li et al. .................... 370/203 |
| 7,274,750 B1 * | 9/2007 | Mueller ..................... 375/297 |
| 7,292,647 B1 * | 11/2007 | Giannakis et al. .......... 375/295 |
| 7,319,723 B2 * | 1/2008 | Jung et al. ................. 375/296 |
| 7,352,691 B2 * | 4/2008 | Hagen et al. ............... 370/210 |
| 7,397,758 B1 * | 7/2008 | Hart et al. .................. 370/208 |
| 7,443,827 B2 * | 10/2008 | Sano ........................ 370/342 |
| 7,489,731 B2 * | 2/2009 | Coulson et al. ............ 375/260 |
| 2002/0150152 A1 * | 10/2002 | Greszczuk et al. ......... 375/219 |
| 2002/0186797 A1 * | 12/2002 | Robinson .................. 375/341 |
| 2002/0191535 A1 * | 12/2002 | Sugiyama et al. .......... 370/208 |
| 2003/0108094 A1 * | 6/2003 | Lai et al. .................. 375/222 |
| 2003/0142754 A1 * | 7/2003 | Jung et al. ................. 375/260 |
| 2004/0022179 A1 * | 2/2004 | Giannakis et al. .......... 370/207 |
| 2004/0076172 A1 * | 4/2004 | Sano ........................ 370/442 |
| 2004/0160906 A1 * | 8/2004 | Greszczuk et al. ......... 370/311 |
| 2004/0190440 A1 * | 9/2004 | Kim et al. .................. 370/210 |

(Continued)

*Primary Examiner*—Minh D Dao
(74) *Attorney, Agent, or Firm*—Rosenberg, Klein & Lee

(57) ABSTRACT

The present invention relates to a transmission system with interference avoidance capability, which includes a transmission apparatus and a receiving apparatus. The transmission method thereof receives first data by means of an interference-processing module of the transmission apparatus and adds a plurality of extension data to the first data to produce second data for replacing a plurality of data corresponding to an interfered band in the second data with zero data, and then producing transmission data. The transmission data is converted to a radio-frequency signal by a transmission-processing module and transmitted to the receiving apparatus. Thereby, signal interference can be prevented by avoiding spectrum overlap regions.

34 Claims, 3 Drawing Sheets

U.S. PATENT DOCUMENTS

| | | | |
|---|---|---|---|
| 2005/0002325 A1* | 1/2005 | Giannakis et al. | 370/208 |
| 2005/0220200 A1* | 10/2005 | Giannakis et al. | 375/260 |
| 2005/0254555 A1* | 11/2005 | Teague | 375/136 |
| 2005/0276340 A1* | 12/2005 | Chow et al. | 375/260 |
| 2005/0286406 A1* | 12/2005 | Jeon et al. | 370/208 |
| 2006/0233273 A1* | 10/2006 | Greszczuk et al. | 375/260 |
| 2007/0036233 A1* | 2/2007 | Yu et al. | 375/260 |
| 2007/0274411 A1* | 11/2007 | Lee et al. | 375/267 |
| 2008/0125046 A1* | 5/2008 | Deng et al. | 455/62 |
| 2008/0232497 A1* | 9/2008 | Hart et al. | 375/260 |
| 2009/0180404 A1* | 7/2009 | Jung et al. | 370/279 |

* cited by examiner

US 7,634,233 B2

TRANSMISSION SYSTEM WITH INTERFERENCE AVOIDANCE CAPABILITY AND METHOD THEREOF

FIELD OF THE INVENTION

The present invention relates generally to a transmission system, and particularly to a transmission system with interference avoidance capability and a method thereof.

BACKGROUND OF THE INVENTION

Modern technologies make progresses day by day. Technological products continuously weed through the old to bring forth the new, particularly in wireless technological products such as cell phones or Bluetooth earphone. The Institute of Electrical and Electronics Engineers (IEEE) regulates many wireless network standards for avoiding interference, which would affect communication qualities, while using wireless products.

Besides, the Federal Communications Commission (FCC) has issued the First Report and Order on Ultra Wide Band (UWB) technology. The publication approved UWB technology in commercial deployment. A spectral mask is announced for ensuring UWB signals will not interfere frequency bands of other protocols, such as sensitive devices in Global Positioning System (GPS), and the Worldwide Interoperability for Microwave Access (WiMAX) protocol. In the spectral mask, there is a wide continuous bandwidth, in which the UWB communication technology adopts the bandwidth from 3.1GHz to 10.6 GHz with the effective isotropic radiated power (EIRP) emission limit being −41.25 dBmi/MHz.

However, because one of the frequency bands used by WiMAX includes the frequency of 3.6 GHz, the spectrum used by the WiMAX and the UWB protocols overlap. Thereby, the paper ECC/TG3 TG3#10_XX, "UWB Interference Mitigation", $10^{th}$ECC/TG3 meeting , Copenhagen, Jul. 2005 published by TI, which is related to interference avoidance technology, used Active Interference Cancellation (AIC) technology to achieve the purpose of interference avoidance. The capability of the notch filter for interference avoidance proposed by TI can reach approximately 30 dB. Nevertheless, such capability is still prone to interference.

Accordingly, a novel transmission system with interference avoidance and a method thereof that can improve the drawbacks of interference due to spectrum overlap are highly needed.

SUMMARY

The purpose of the present invention is to provide a transmission system with interference avoidance capability and a method thereof, which prevent signal interference by means of an interference-processing module for avoiding spectrum overlap regions.

Another purpose of the present invention is to provide a transmission system with interference avoidance capability and a method thereof, which avoid spectrum overlap for preventing signal interference by adding an extension unit for increasing extension data as well as a multiplexer.

The transmission system with interference avoidance capability according to the present invention includes a transmission apparatus and a receiving apparatus. The transmission apparatus includes a first inverse fast Fourier transform unit, an interference-processing module, and a transmission-processing module. The receiving apparatus includes a receiving-processing module, a removal unit, and a fast Fourier transform unit. The transmission method according to the present invention includes receiving input data and transforming the input data to first data by the first inverse fast Fourier transform unit, receiving the first data and adding a plurality of extension data to the first data by the interference-processing module to produce second data for replacing a plurality of data corresponding to an interfered band in the second data with zero data and then producing transmission data, converting the transmission data to a radio-frequency signal by the transmission-processing module, and transmitting the radio-frequency signal.

The transmission method according to the present invention further includes receiving the radio-frequency signal by the receiving-processing module of the receiving apparatus and converting the radio-frequency signal to received data, removing the plurality of extension data from the received data by the removal unit to producing recovered data, and transforming the recovered data by the fast Fourier transform unit to produce output data.

DETAILED DESCRIPTION

In order to make the structure and characteristics as well as the effectiveness of the present invention to be further understood and recognized, the detailed description of the present invention is provided as follows along with preferred embodiments and accompanying figures.

The transmission system with interference avoidance capability according to the present invention is applied in an orthogonal frequency division multiplexing (OFDM) system of UWB for avoiding the frequency band used the WiMAX protocol. Thereby, signal interference in the frequency band can be prevented. However, the present invention is not limited to the application. The application is only a preferred embodiment of the present invention.

Figure 1:
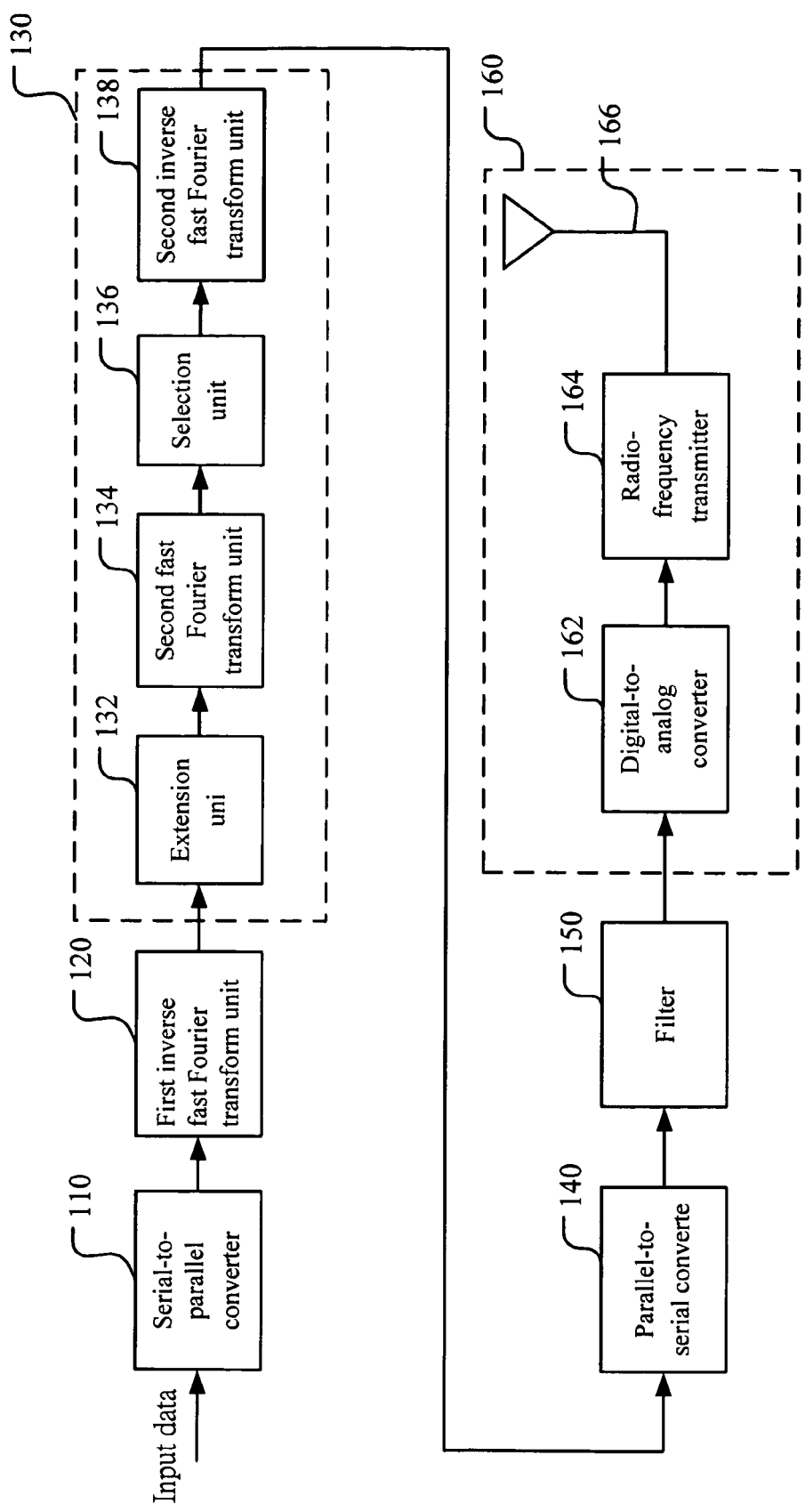
FIG. 1 shows the block diagram of a transmission apparatus according to a preferred embodiment of the present invention.

FIG. 1 shows the block diagram of a transmission apparatus according to a preferred embodiment of the present invention. As shown in the figure, the transmission apparatus 1 of the transmission system with interference avoidance capability according to the present invention includes a serial-to-parallel converter 110, a first inverse fast Fourier transform unit 120, an interference-processing module 130, a parallel-to-serial converter 140, a filter 150, and a transmission-processing module 160. The serial-to-parallel converter 110 receives input data, coverts the serial input data to parallel input data, and transmits the parallel input data to the first inverse fast Fourier transform unit 120. The first inverse fast Fourier transform unit 120 receives the parallel input data and transforms the frequency-domain parallel input data to first data, which is time-domain input data.

The interference-processing module 130 receives the first data and adds a plurality of extension data to the first data for increasing resolution of the first data, and thereby produces second data. Then a plurality of data corresponding to an interfered band in the second data is replaced with zero data to produce transmission data. Where while adding the plurality of extension data, which is a plurality of zero data, and replacing the plurality of data corresponding to an interfered band in the second data with zero data, the accuracy of the first data is enhanced, and thereby interfered band can be avoided accurately.

The parallel-to-serial converter 140 converts the parallel transmission data to serial transmission data. The filter 150 receives the serial transmission data and filters unnecessary noises. The filter 150 can be a square-root raised cosine filter. The transmission-processing module 160 receives the transmission data, converts it to a radio-frequency signal, and then transmits the radio-frequency signal.

In addition, the interference-processing module 130 further includes an extension unit 132, a second fast Fourier transform unit 134, a selection unit 136, and a second inverse fast Fourier transform unit 138. The extension unit 132 adds the plurality of extension data to the first data for increasing its resolution and thus producing the second data, wherein the plurality of extension data can be a plurality of zero data. Besides, the larger the number of the plurality of extension data is, the higher the resolution of the first data is. The second fast Fourier transform unit 134 receives the second data and transforms the time-domain second data to frequency-domain second data, which is third data. The selection unit 136 identifies the plurality of data corresponding to an interfered band and replaces it with zeros with the other data remained unchanged for producing fourth data. The second inverse fast Fourier transform unit 138 transforms the frequency-domain fourth data to time-domain fourth data to produce the transmission data. The selection unit 136 can be a multiplexer, and according to a zero-tone selection signal, identifies the plurality of data corresponding to an interfered band in the third data and replaces it with zeros.

Besides, the transmission-processing module 160 further includes a digital-to-analog converter 162, a radio-frequency transmitter 164, and a transmission antenna 166. The digital-to-analog converter 162 converts the transmission data to analog transmission data. The radio-frequency transmitter 164 receives the analog transmission data as a radio-frequency signal, and then transmits the radio-frequency signal via the transmission antenna 166.

Figure 2:
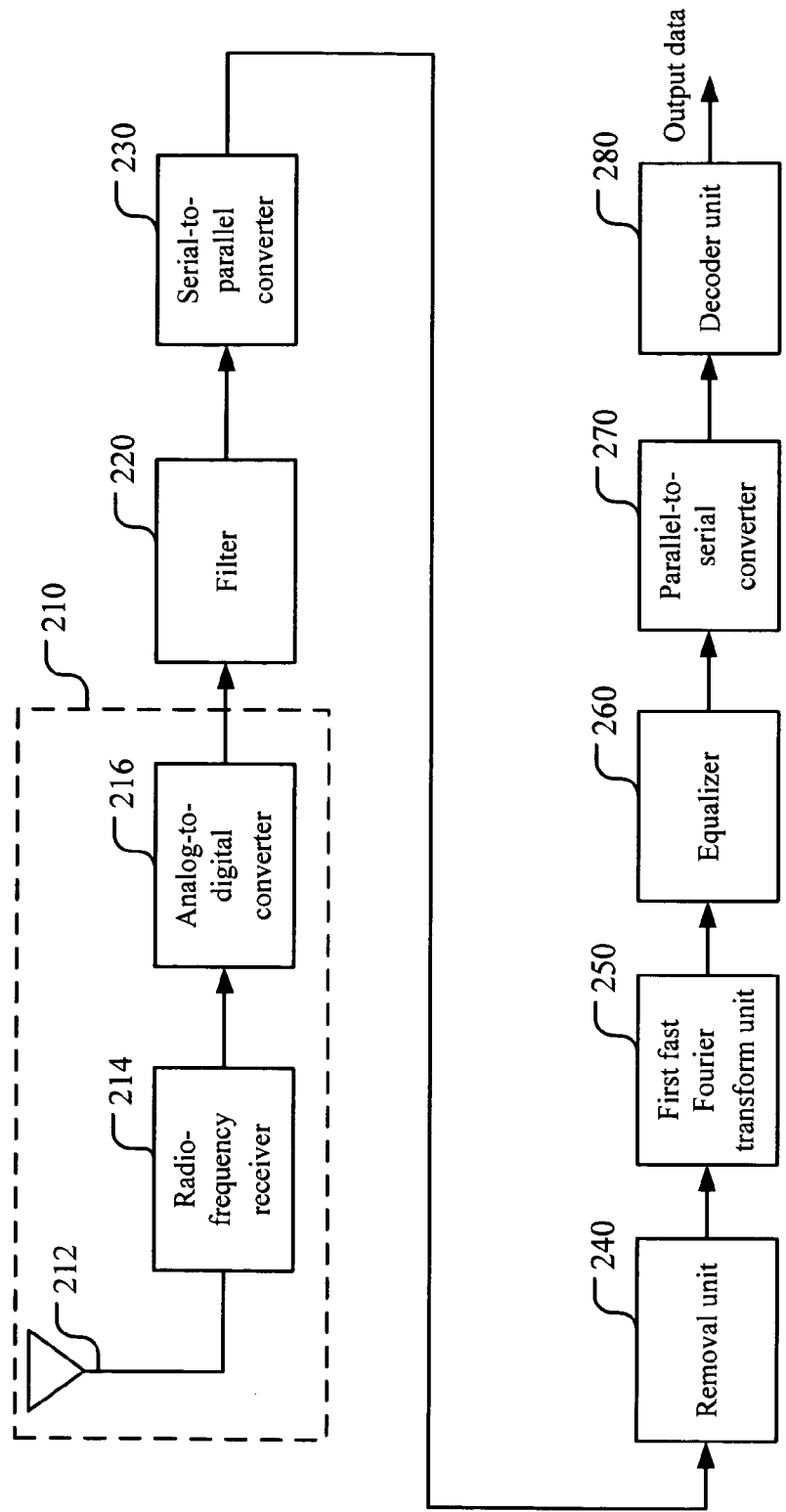
FIG. 2 shows the block diagram of a receiving apparatus according to a preferred embodiment of the present invention.

FIG. 2 shows the block diagram of a receiving apparatus according to a preferred embodiment of the present invention. As shown in the figure, the receiving apparatus 2 of the transmission system with interference avoidance capability according to the present invention includes a receiving-processing module 210, a filter 220, a serial-to-parallel converter 230, a removal unit 240, a first fast Fourier transform unit 250, a equalizer 260, a parallel-to-serial converter 270, and a decoder unit 280. The receiving-processing unit 210 receives the radio-frequency signal transmitted by the transmission apparatus, and converts the radio-frequency signal to received data. The filter 220, which can be a square-root raised cosine filter, filters noises of the received data. The serial-to-parallel converter 230 converts the received data to a parallel received data, and transmits it to the removal unit 240. The removal unit 240 removes the plurality of extension data from the received data, which means removing the added extension data to the first data by the extension unit 132 of the transmission apparatus 1, and thereby produces recovered data. The first fast Fourier transform unit 250 transforms the recovered data and produces output data. The equalizer 260 receives the output data and equalizes the output data for compensating the channel effects during data transmission. The parallel-to-serial converter 270 converts the parallel output data to serial output data. The decoder unit 280 decodes the output data and thus data transmission is completed.

Moreover, the receiving-processing module 210 further includes a receiving antenna 212, a radio-frequency receiver 214, and an analog-to-digital converter 216. The receiving antenna 212 receives the radio-frequency signal to the radio-frequency receiver 214. The radio-frequency receiver 214 converts the radio-frequency signal to received data. The analog-to-digital converter 216 converts the analog received data to digital received data.

Figure 3:
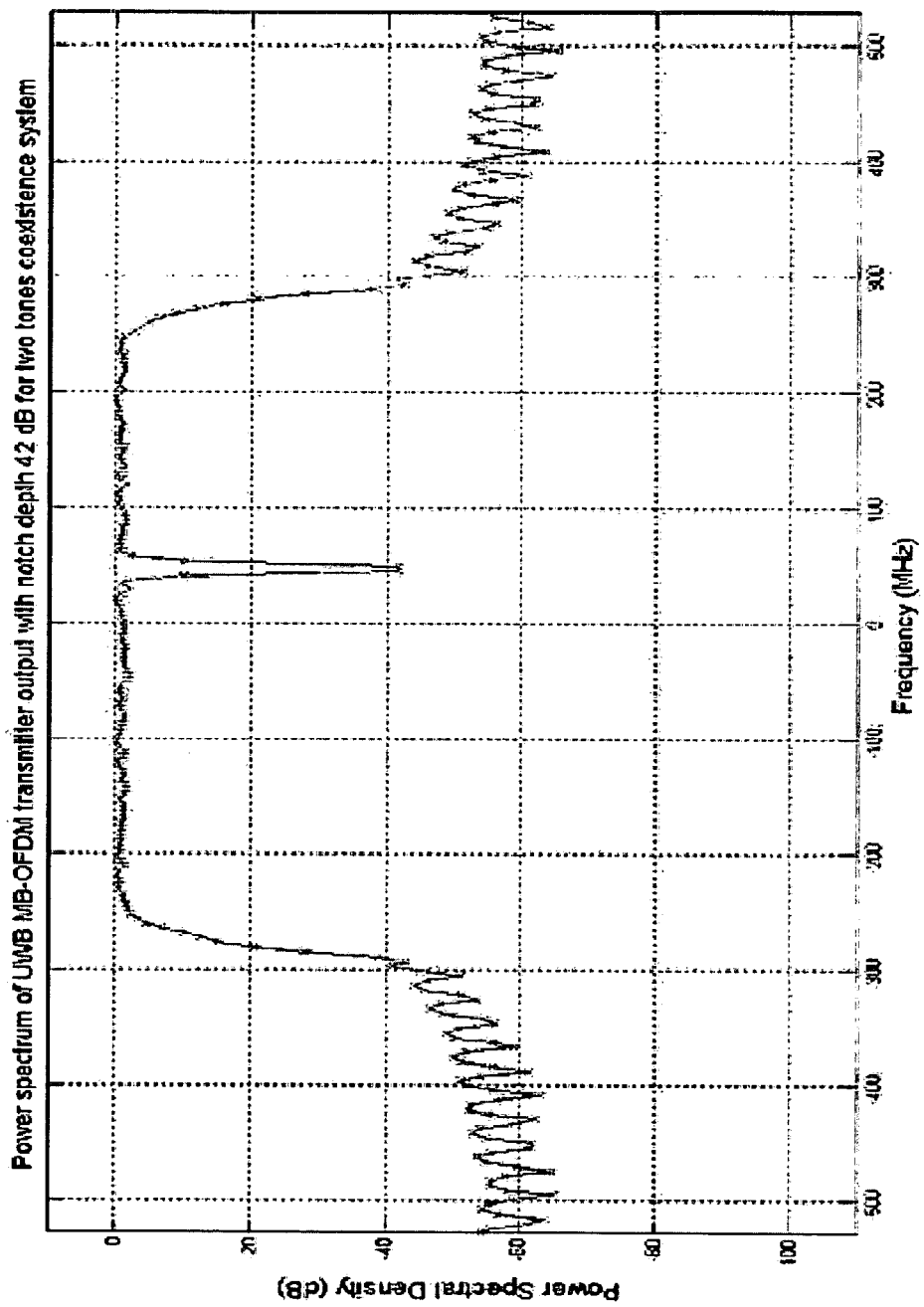
FIG. 3 shows the spectrum diagram according to a preferred embodiment of the present invention.

FIG. 3 shows the spectrum diagram according to a preferred embodiment of the present invention. As shown in the figure, the application is OFDM used in UWB. The frequency band used by the UWB technology is between 3.1 GHz and 10.6 GHz, which is overlapped with the frequency 3.6 GHz used by WiMAX. Besides, the maximum bandwidth used by WiMAX is 20 MHz, thereby UWB has to avoid transmitting signals within the 20 MHz bandwidth of WiMAX for preventing signal interference. The present invention increases resolution of the input data of the transmission apparatus by adding the extension data. For example, the resolution of the input data is five, which divides the 20 MHz bandwidth into five frequency bands with 4 MHz-bandwidth each. When the extension data is added to the input data, the resolution of the input data is increased to ten, which divides the 20 MHz bandwidth into ten frequency bands with 2 MHz-bandwidth each. Thus, the resolution of the input data is increased and thereby the accuracy of the UWB technology is enhanced accordingly. That is, it is more capable of avoiding the 20 MHz-bandwidth.

Furthermore, because each data is a sinc-waveform in spectrum, when the resolution of the input data is increased, the sinc-waveform narrowed and the signal intensity of the sidelobes thereof decreases. Consequently, when the interference-processing module shuts necessary signals down, because of lower signal intensity of the sidelobes of the sinc-wave, the interference avoidance capability of the present invention is enhanced. As shown in FIG. 3, the interference avoidance capability of the present invention reaches 42 dB, which can prevent signal interference effectively.

To sum up, the transmission system with interference avoidance capability and the method thereof according to the present invention receives first data by means of an interference-processing module of a transmission apparatus and adds a plurality of extension data to the first data to produce second data for replacing a plurality of data corresponding to an interfered band in the second data with zero data, and then producing transmission data. The transmission data is converted to a radio-frequency signal by a transmission-processing module and transmitted to a receiving apparatus for receiving the radio-frequency signal. A removal unit of the receiving apparatus removes the extension data of input data for recovering the corresponding input data. Thereby, signal interference can be prevented by avoiding spectrum overlap regions.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A transmission system with interference avoidance capability, comprising:
   a transmission apparatus, comprising:
      a first inverse fast Fourier transform unit, receiving input data and transforming the input data to first data;
      an interference-processing module, receiving the first data and adding a plurality of extension data to the first data to produce second data for replacing a plurality of data corresponding to an interfered band in the second data with zero data, and producing transmission data;
      a transmission-processing module, converting the transmission data to a radio-frequency signal, and transmitting the radio-frequency signal;
   a receiving apparatus, comprising:
      a receiving-processing module, receiving the radio-frequency signal, and converting the radio-frequency signal to received data;
      a removal unit, removing the plurality extension data of the received data, and producing recovered data; and
      a first fast Fourier transform unit, transforming the recovered data for producing output data.

2. The transmission system of claim 1, wherein the interference-processing module further includes:
   an extension unit, adding the plurality of extension data to the first data, and producing the second data;
   a second fast Fourier transform unit, transforming the second data, and producing third data;
   a selection unit, identifying the plurality of data corresponding to an interfered band and replacing it with zeros with the other data remained unchanged, and producing fourth data;
   a second inverse fast Fourier unit, transforming the fourth data to the transmission data.

3. The transmission system of claim 2, wherein the selection unit is a multiplexer.

4. The transmission system of claim 1, wherein the extension data is a plurality of zeros.

5. The transmission system of claim 1, wherein the transmission-processing module further includes:
   a digital-to-analog converter, converting the transmission data to an analog transmission data;
   a radio-frequency transmitter, converting the analog transmission data to the radio-frequency signal; and
   a transmission antenna, transmitting the radio-frequency signal.

6. The transmission system of claim 5, wherein the transmission-processing module further includes a filter, filtering the transmission data and transmitting it to the digital-to-analog converter.

7. The transmission system of claim 6, wherein the filter is a square-root raised cosine filter.

8. The transmission system of claim 1, wherein the transmitting apparatus includes a serial-to-parallel converter, converting the serial input data to parallel input data, and transmitting it to the inverse fast Fourier transform unit.

9. The transmission system of claim 1, wherein the transmitting apparatus includes a parallel-to-serial converter, converting the parallel transmission data to serial transmission data, and transmitting it to the transmission-processing module.

10. The transmission system of claim 1, wherein the receiving-processing module includes:
    a receiving antenna, receiving the radio-frequency signal;
    a radio-frequency receiver, converting the radio-frequency signal to the received data; and
    an analog-to-digital converter, converting the analog received data to digital received data.

11. The transmission system of claim 10, wherein the receiving-processing module further includes a filter, filtering the received data for transmitting to the removal unit.

12. The transmission system of claim 11, wherein the filter is a square-root raised cosine filter.

13. The transmission system of claim 1, wherein the receiving apparatus further includes a serial-to-parallel converter, converting the received data to parallel received data, and transmitting it to the removal unit.

14. The transmission system of claim 1, wherein the receiving apparatus includes a parallel-to-serial converter, converting the parallel output data to serial output data.

15. The transmission system of claim 1, wherein the receiving apparatus further includes an equalizer, equalizing the output data.

16. The transmission system of claim 1, wherein the receiving apparatus further includes a decoder unit, decoding the output data.

17. The transmission system of claim 1, wherein the transmission system is applied in an Orthogonal Frequency Division Multiplexing (OFDM) system.

18. A transmission method with interference avoidance capability, comprising steps of:
    receiving input data and transforming the input data to first data;
    receiving the first data and adding a plurality of extension data to the first data to produce second data for replacing a plurality of data corresponding to an interfered band in the second data with zero data, and then producing transmission data;
    "converting the transmission data to a radio-frequency signal by the" changed to "converting the transmission data to a radio-frequency signal by a" transmission-processing module, and transmitting the radio-frequency signal;
    receiving the radio-frequency signal, and converting the radio-frequency signal to received data;
    removing the plurality of extension data from the received data to producing recovered data; and
    transforming the recovered data to produce output data.

19. The method of claim 18, wherein the step of receiving the first data and adding a plurality of extension data to the first data to produce second data for replacing a plurality of data corresponding to an interfered band in the second data with zero data, and then producing transmission data further includes:
    adding the plurality of extension data to the first data, producing the second data;
    transforming the second data, and producing third data;
    identifying the plurality of data corresponding to an interfered band and replacing it with zeros with the other data remained unchanged, and producing fourth data; and
    converting the fourth data to the transmission data.

20. The method of claim 19, wherein the step of identifying the plurality of data corresponding to an interfered band and replacing it with zeros with the other data remained unchanged, and producing fourth data is completed by using multiplexing.

21. The method of claim 18, wherein the plurality of extension data is a plurality of zero data.

22. The method of claim 18, wherein the step of converting the transmission data to a radio-frequency signal by the transmission-processing module, and transmitting the radio-frequency signal further includes:

converting the transmission data to an analog transmission data;

converting the transmission data to the radio-frequency signal; and transmitting the radio-frequency signal.

23. The method of claim 22, and further comprising a step of filtering the transmission data for converting the transmission data.

24. The method of claim 23, wherein the filtering method is the square-root raised cosine filtering method.

25. The method of claim 18, and further comprising a step of converting the serial input data to parallel input data for converting the input data to first data.

26. The method of claim 18, and further comprising a step of converting the parallel transmission data to serial transmission data for converting the transmission data to the radio-frequency signal.

27. The method of claim 18, wherein the step of receiving the radio-frequency signal, and converting the radio-frequency signal to received data further includes:

receiving the radio-frequency signal;

converting the radio-frequency signal to the received data; and converting the analog received data to digital received data.

28. The method of claim 27, and further comprising a step of filtering the received data for removing the plurality of extension data from the received data.

29. The method of claim 28, wherein the filtering method is the square-root raised cosine filtering method.

30. The method of claim 18, and further comprising a step of converting the serial received data to parallel received data for removing the plurality of extension data from the received data.

31. The method of claim 18, and further comprising a step of converting parallel output data to serial output data.

32. The method of claim 18, and further comprising a step of equalizing the output data.

33. The method of claim 18, and further comprising a step of decoding the output data.

34. The method of claim 18, wherein the method is applied in an Orthogonal Frequency Division Multiplexing (OFDM) system.

* * * * *